United States Patent [19]
Bartlett et al.

[11] Patent Number: 5,745,588
[45] Date of Patent: Apr. 28, 1998

[54] DIFFERENTIAL MICROPHONE ASSEMBLY WITH PASSIVE SUPPRESSION OF RESONANCES

[75] Inventors: Charles Spurgeon Bartlett, Clinton, Md.; Michael Anthony Zuniga, Fairfax, Va.

[73] Assignee: Lucent Technologies Inc., Murray Hill, N.J.

[21] Appl. No.: 655,781

[22] Filed: May 31, 1996

[51] Int. Cl.$^6$ .................................................. H04R 25/00
[52] U.S. Cl. .......................... 381/170; 381/168; 381/155
[58] Field of Search ................................ 381/91, 122, 154, 381/155, 157, 168, 169, 170, 177, 191; 379/428, 433

[56] References Cited

U.S. PATENT DOCUMENTS

| | | | |
|---|---|---|---|
| 3,573,400 | 4/1971 | Sessler et al. | 381/155 |
| 3,715,500 | 2/1973 | Sessler et al. | 381/191 |
| 4,850,016 | 7/1989 | Groves et al. | |
| 5,473,684 | 12/1995 | Bartlett et al. | |
| 5,511,130 | 4/1996 | Bartlett et al. | |
| 5,539,834 | 7/1996 | Bartlett et al. | 381/170 |

OTHER PUBLICATIONS

W. A. Beaverson and A. M. Wiggins, "A Second Order Gradient Noise Cancelling Microphone Using a Single Diaphragm," J. Acoust. Soc. Am., 22 (1950), pp. 592–601.
A. J. Brouns, "Second Order Gradient Noise Cancelling Microphone," IEEE International Conference on Acoustics, Speech and Signal Processing, (May 1981), pp. 786–789.
J. L. Flanagan, et al., "Autodirective Microphone Systems," Acustica, vol. 73, (1991), pp. 58–71.
G. M. Sessler, et al., "Second-order gradient unidirectional microphones utilizing an electret transducer," J. Acoust. Soc. Am., vol. 58, No. 1, Jul. 1975, pp. 273–278.

*Primary Examiner*—Huyen Le
*Attorney, Agent, or Firm*—Martin I. Finston

[57] ABSTRACT

An improved, single diaphragm SOD microphone uses acoustic filters to remove resonances associated with the ducting that guides the ambient sound pressure to the front and rear faces of a FOD microphone element. The microphone element communicates with respective front and rear chambers, two ports communicate with the front chamber via front conduits, and two ports communicate with the rear chamber via rear conduits. The microphone further comprises first and second side chambers for dissipating acoustic energy of undesired resonances. The first side chamber communicates with the front conduits, and the second side chamber communicates with the rear conduits. In specific embodiments of the invention, each of the side chambers comprises a branch conduit approximately equal in length to one-quarter wavelength of an undesired resonance. In certain embodiments, each of these branch conduits includes a small neck joining the branch conduit to its corresponding front or rear conduits. In other embodiments of the invention, each of the side chambers comprises a Helmholtz resonator. Each Helmholtz resonator, in turn, comprises a short branch conduit leading to a resonant cavity having a prescribed volume.

7 Claims, 6 Drawing Sheets

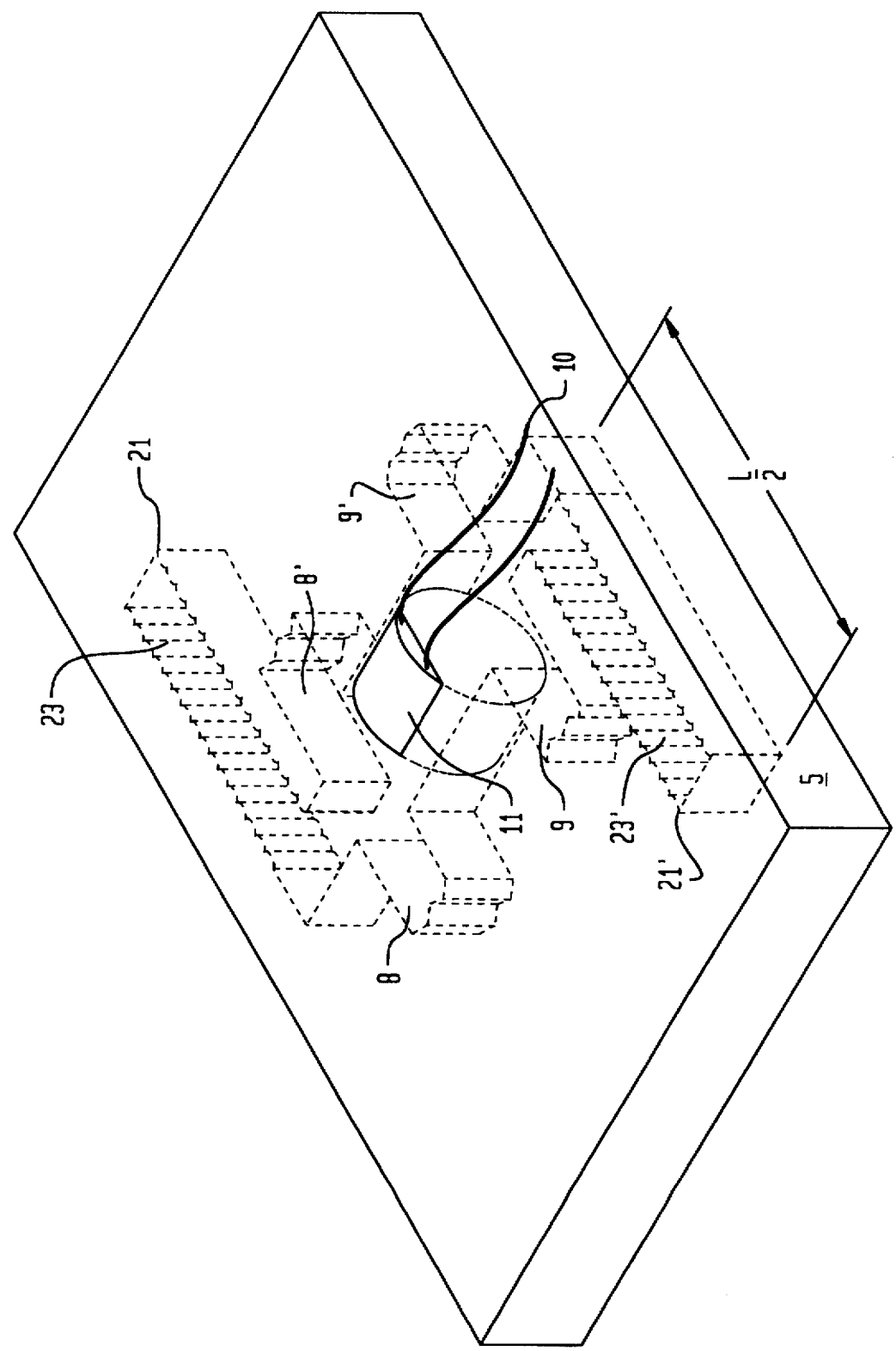

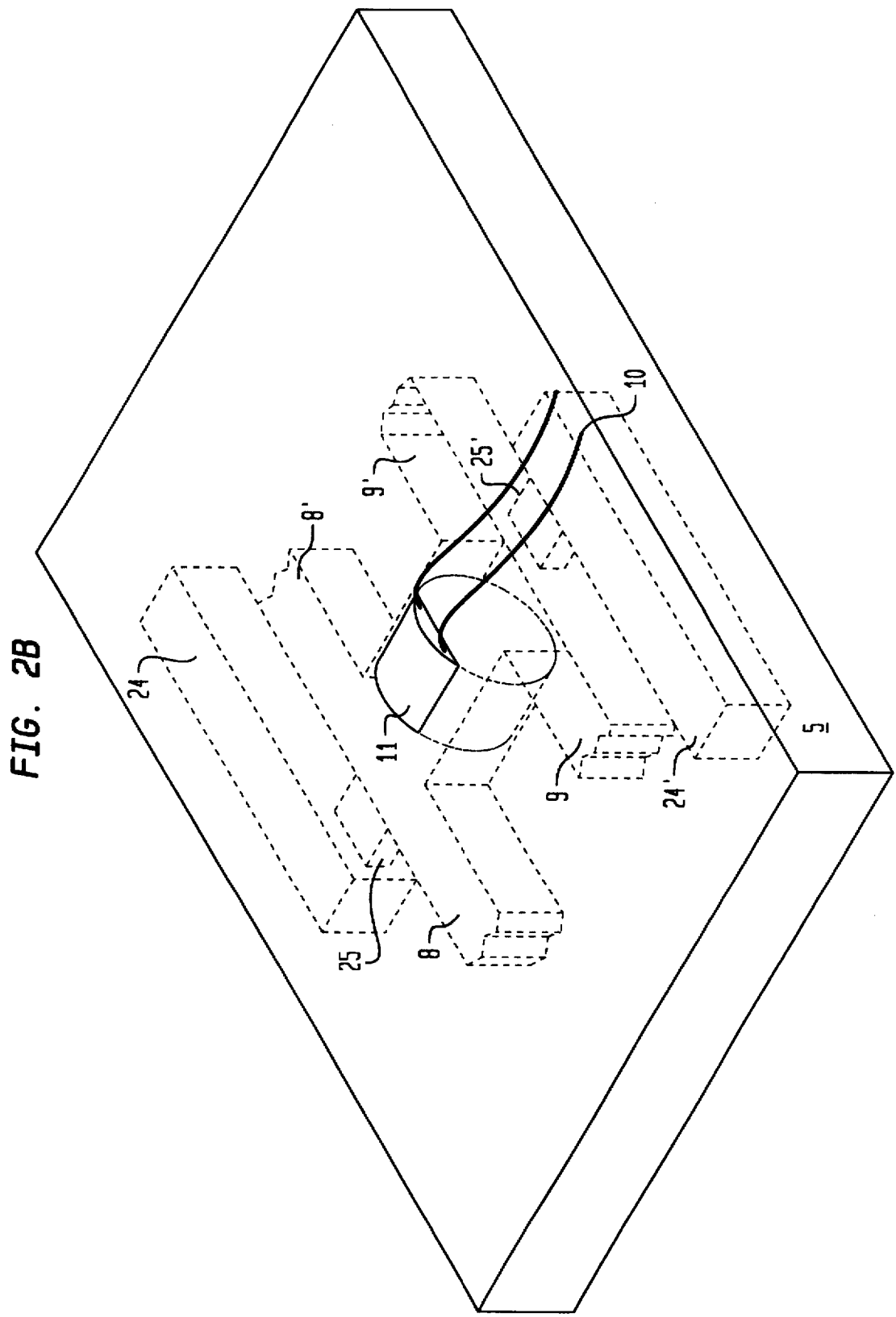

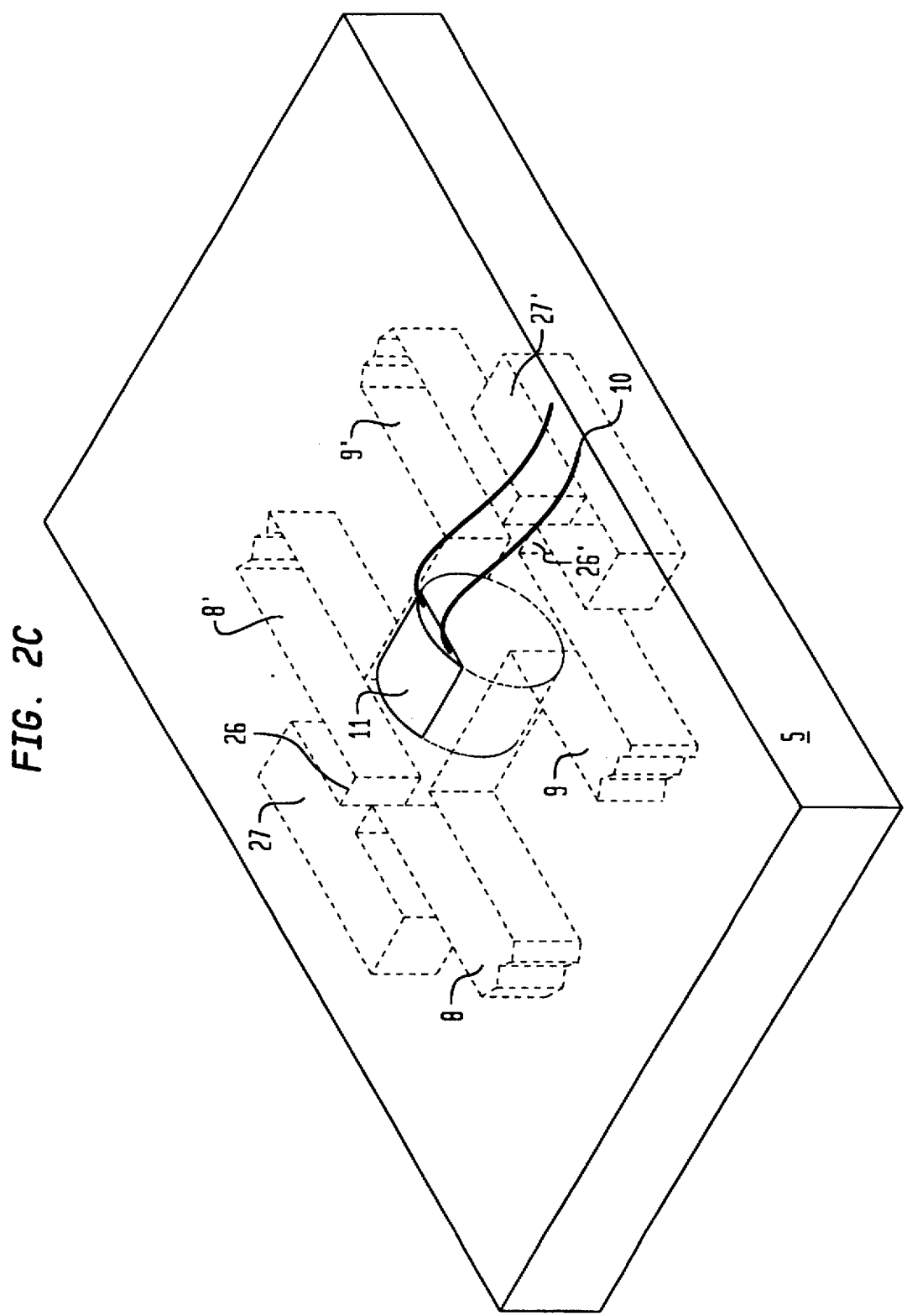

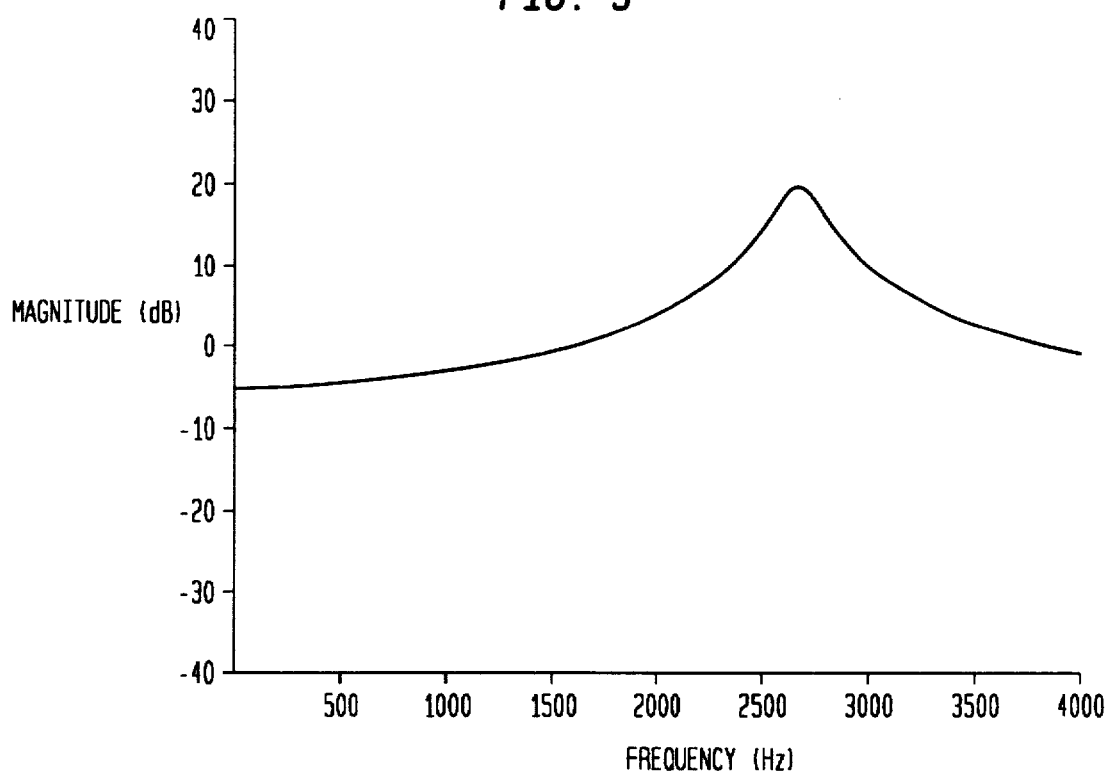
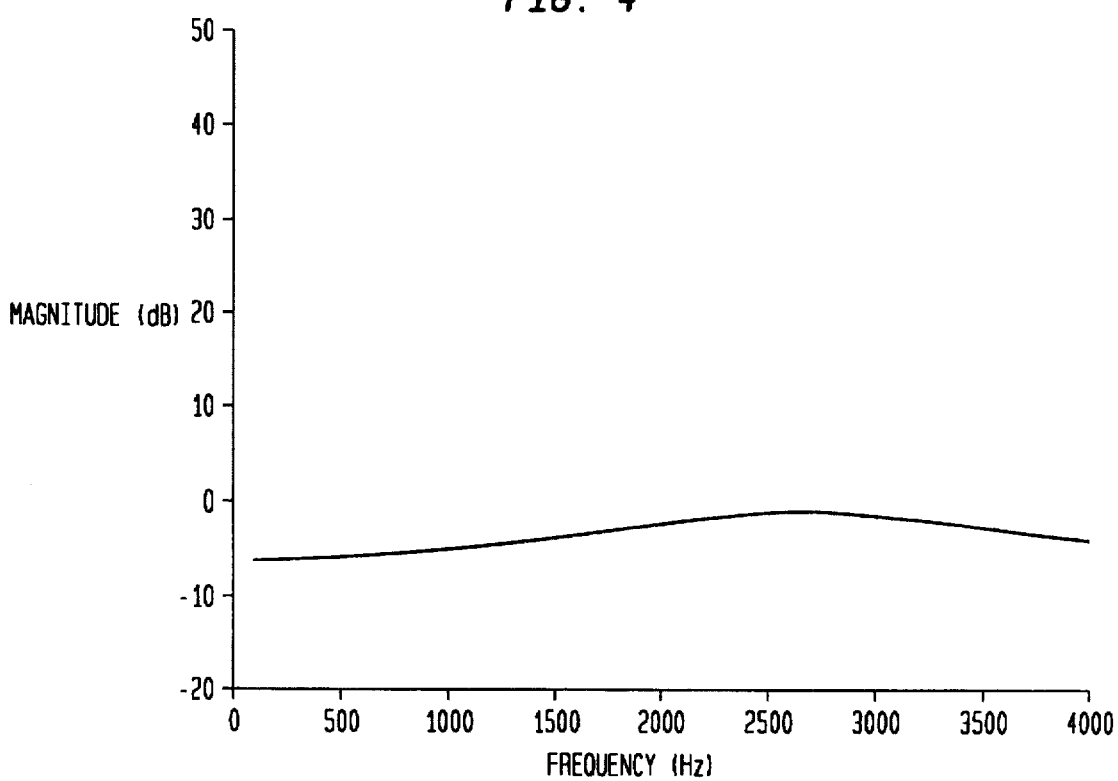

5,745,588

DIFFERENTIAL MICROPHONE ASSEMBLY WITH PASSIVE SUPPRESSION OF RESONANCES

BACKGROUND OF THE INVENTION

Second order differential (SOD) microphones have long been recognized for their superior noise cancelling performance relative to first order differential (FOD) or zero order differential (pressure) microphones. Realizations of a working SOD microphone were described in W. A. Beaverson and A. M. Wiggins, "A Second Order Gradient Noise Cancelling Microphone Using a Single Diaphragm," J. Acoust. Soc. Am., 22 (1950), pp. 592–601, and A. J. Brouns, "Second Order Gradient Noise Cancelling Microphone," IEEE International Conference on Acoustics, Speech and Signal Processing, (May 1981), pp. 786–789. More recently, a practical SOD microphone design is discussed in U.S. Pat. No. 5,511,130, issued on Apr. 23, 1996, to C. Bartlett and M. A. Zuniga, under the title, "Single Diaphragm Second Order Differential Microphone Assembly." In these various implementations of SOD microphones, acoustic ports and ducts within an enclosure are used to sample the ambient pressure field and guide the acoustic energy to the sensing element which could be, for example, a moving coil, a piezoelectric transducer or a foil electret diaphragm. However, associated with the duct lengths in these designs are undesirable acoustic resonances that, because of design constraints in certain applications, may fall within the frequency band of voice transmission (e.g., 200–3500 Hz for telephony). As discussed in the above-cited U.S. Pat. No. 5,511,130, an electronic filter may be used to effectively compensate for acoustic resonances in the voice response of the SOD output signal. However, even when the design of such a compensation filter is straightforward, it may be advantageous to minimize the complexity of additional required circuitry or, if possible, eliminate the circuitry altogether.

SUMMARY OF THE INVENTION

One way to reduce, or even eliminate, the need for compensating circuits is to modify the acoustic ducting to make it acoustically filter the guided acoustic field, and thus passively compensate for undesired acoustic resonances in a manner which preserves the second order differential properties of the microphone.

We have invented an improved, single diaphragm SOD microphone that uses acoustic filters to remove resonances associated with the ducting that guides the ambient sound pressure to the front and rear faces of the microphone element. Consequently, the response of our inventive microphone to ambient sound can be made substantially free of resonant behavior. As a result, the microphone will require little or none of the additional electronic filtering that might otherwise be required to remove the effects of resonant behavior.

Moreover, even with features adapted for passive acoustic filtering, embodiments of our SOD microphone retain the advantage of being readily mass produceable.

Thus in one embodiment, our invention involves a SOD microphone of the kind in which a FOD microphone element communicates with respective front and rear chambers, two ports communicate with the front chamber via front conduits, and two ports communicate with the rear chamber via rear conduits. In contrast to SOD microphones of the prior art, our microphone further comprises first and second side chambers for dissipating acoustic energy of undesired resonances of the microphone. The first side chamber communicates with the front conduits, and the second side chamber communicates with the rear conduits.

In specific embodiments of the invention, each of the side chambers comprises a branch conduit approximately equal in length to one-quarter wavelength of an undesired resonance. In certain embodiments, this length includes a small neck joining the branch conduit to its corresponding front or rear conduits. In yet other embodiments of the invention, each of the side chambers comprises a Helmholtz resonator. Each Helmholtz resonator, in turn, comprises a short branch conduit leading to a resonant chamber having a prescribed volume.

DESCRIPTION OF THE DRAWINGS

FIG. 2A is a schematic diagram of a single diaphragm SOD microphone according to the invention in one embodiment. Visible in the figure are branch conduits having periodic variations of the cross sectional area. These variations produce sidewall serrations that enhance acoustic dissipation.

FIG. 2B is a schematic diagram of a single diaphragm SOD microphone according to the invention in one embodiment. Visible in the figure is a connection of branch conduits, through a narrow neck, to the front and rear conduits.

FIG. 2C is a schematic diagram of a single diaphragm SOD microphone according to the invention in one embodiment. Visible in the figure are Helmholtz resonators coupled, respectively, to the front and rear conduits.

FIG. 3 is a theoretical plot of the frequency response of the acoustical transfer function, $K(\omega)$, from each port to the microphone diaphragm for the SOD microphone of FIG. 1.

FIG. 4 is a theoretical plot of the frequency response of the acoustical transfer function, $K(\omega)$, from each port to the microphone diaphragm for the inventive SOD microphone of FIG. 2A.

DETAILED DESCRIPTION OF THE INVENTION

Figure 1:
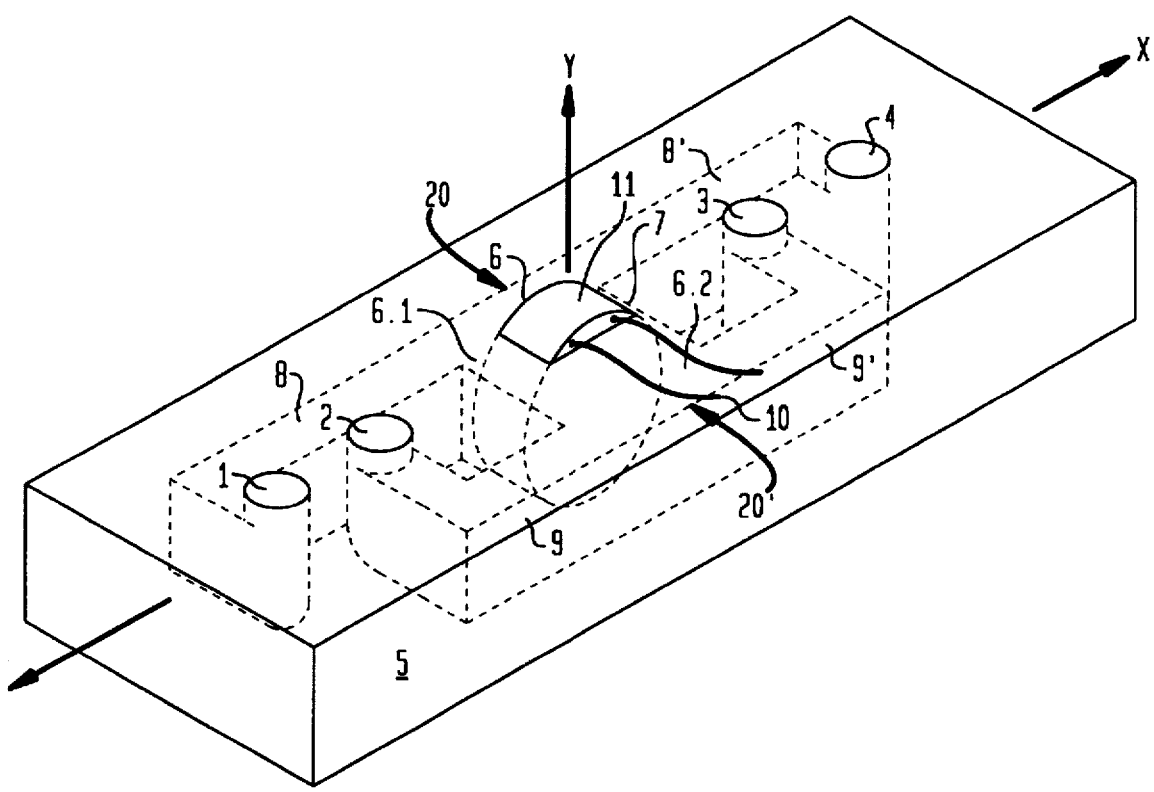
FIG. 1 is a schematic diagram of a single diaphragm SOD microphone of the prior art, as disclosed in U.S. Pat. No. 5,511,130, cited above. In at least some cases, electronic filtering is advantageously employed to reduce the effects of acoustical resonance in the conduits of this microphone.

We first describe certain features that are common to our inventive microphone and the prior-art microphone of FIG. 1. As depicted in FIG. 1, our microphone includes an enclosure 5 having a cavity 6 into which a commercially available FOD microphone element 11, such as an electret microphone element, is readily inserted without the need for penetrating the casing of the microphone element as provided by the commercial supplier.

Within the aforementioned enclosure containing the FOD microphone element, a front cavity portion 6.1, referred to as the front chamber, is defined adjacent to the front side of the FOD microphone diaphragm (the diaphragm is contained within element 11, and is not shown in the figure), and similarly, a rear cavity portion 6.2, referred to as the rear chamber, is defined adjacent the rear side of the diaphragm.

A pair of conduits 8, 8', referred to as "front conduits," conduct acoustic energy from first port 1 and fourth port 4, respectively, to the front chamber 6.1. Similarly, a pair of rear conduits 9, 9', conduct acoustic energy from second port 2 and third port 3, respectively, to the rear chamber 6.2.

The four ports 1–4 are similar in their acoustic characteristics and are, typically, of approximately equal dimensions. The four ports will typically lie in a common plane, and they will typically line up along a common centerline. The distance between the first and second ports is desirably made the same, or nearly the same, as the distance between the third and fourth ports.

The two front conduits 8, 8', and the two rear conduits 9, 9', are all desirably made with equivalent lengths and equivalent cross sectional areas, and they are desirably formed to meet their respective cavities (i.e., front chamber 6.1 and rear chamber 6.2) in an acoustically equivalent manner.

Also shown in FIG. 1 is a pair 10 of electrical leads connected to microphone element 11.

One readily manufacturable embodiment of such a microphone is assembled from laminar plates, for example, plates of a polymeric material formed by injection molding. The various cavities and conduits described above, as well as those to be described below, are readily provided as channels formed in these laminar plates during the molding process, or, e.g., by stamping or milling.

In addition to the features described above, which our inventive microphone shares in common with the prior art microphone of FIG. 1, the inventive microphone has certain novel features which we now describe with reference to FIG. 2A. (FIG. 2A also depicts some of the common features referred to above. However, for simplicity of presentation, the front conduits 8, 8', and the rear conduits 9, 9', are shown only in abbreviated form in FIG. 2A, and the ports 1–4 are not shown.)

Depicted in FIG. 2A are two further conduits 21, 21', which we refer to hereinafter as the "front branch conduit" and the "rear branch conduit", respectively. Turning back to FIG. 1, it will be evident that the pair of front conduits 8, 8' has a common sidewall region adjacent front chamber 6.1, on the side of the conduits lying distal the microphone element. Similarly, it will be evident that the pair of rear conduits 9, 9' has a common sidewall region adjacent rear chamber 6.2, on the side of those conduits lying distal the microphone element. Turning again to FIG. 2A, as shown there, the front branch conduit 21 is formed so as to intersect the sidewall of the front conduits in this common region thereof. Similarly, the rear branch conduit 21' is formed so as to intersect the sidewall of the rear conduits in this common region thereof.

The front and rear branch conduits are desirably of equal, or nearly equal, lengths and cross sectional areas, and they desirably intersect the respective sidewall regions in an acoustically equivalent manner.

Two illustrative, alternate embodiments of the invention will now be described.

In a first embodiment, the length of each branch conduit is approximately one quarter acoustic wavelength at a resonant frequency to be reduced or eliminated. In typical cases, this resonant frequency will be a fundamental mode of the front and rear conduits, i.e., a resonance having a wavelength twice the length of the front or rear conduit. In such a case, the length of each branch conduit is desirably made equal, or nearly equal, to half the length of its corresponding front or rear conduit. (In this regard, two lengths are "nearly equal" if they differ by no more than one-tenth the guided wavelength of some acoustic tone within the passband of the microphone.)

Further, each branch conduit ends, distal its intersection with the corresponding conduit sidewall, in an acoustically rigid termination within enclosure 5.

As a consequence of the one-quarter-wave condition in the branch conduits, acoustic waves at the resonant frequency that propagate into a branch conduit will reflect from the rigid termination and return to the point of intersection with the corresponding front or rear conduits with a net phase shift of 180°. Because of this phase shift, the reflected wave will destructively interfere with the acoustic waves in the corresponding front or rear conduit.

It is advantageous to provide a feature for dissipating resonant acoustic energy in the branch conduits. As shown in FIG. 2A and described in greater detail below, one such feature is a set of serrations 23, 23' on the inner sidewall surface of each of the branch conduits. As shown in FIG. 2B and also described in greater detail below, another such feature is a short and thin neck 25, 25' joining each branch conduit to its corresponding front or rear conduits. (The length of such a neck is preferably no more than one-tenth the resonant wavelength.) Any such energy-dissipating feature should act in an acoustically equivalent manner for both of the branch conduits.

An appropriate adjustment of the amount of acoustic dissipation in the branch conduits can lead to substantially resonance-free microphone output over the voice frequency band.

It should be noted in this regard that the branch conduits are not required to be straight, nor are they required to be oriented in any particular direction. However, each branch conduit should present the same, or nearly the same, acoustic impedance to its corresponding front or rear conduits. For this reason, it is desirable for each branch conduit to have the same cross-sectional area. In cases in which this area is not constant, it is desirable to have the same variation, in both branch conduits, of cross-sectional area as a function of longitudinal position within the conduit Certain physical principles of our improved SOD microphone are now described with reference to FIG. 1.

In general, the acoustic system associated with each branch conduit presents an acoustic branch impedance, $Z_b$, to the acoustic wave conducted from each port to the microphone diaphragm. (For a discussion of acoustic impedance, see, e.g., Kinsler, Frey, Coppen, and Sanders, *Fundamentals of Acoustics*, Third Edition, John Wiley & Sons, 1982.)

Let P1, P2, P3 and P4, respectively, stand for the acoustic pressure values at ports 1–4. Microphone 11 produces a signal output at electrical leads 10 that is proportional to the net pressure difference across the front and rear diaphragm faces. That is, DIFF2=$K(\omega)$[(P1+P4)−(P2+P3)], where $K(\omega)$ is the frequency dependent acoustic transfer function from the ports to the diaphragm, given theoretically by:

$$K(\omega) = \frac{2e^{jkL/2}}{(i - e^{jkL})[2i\cot(kL/2) + Z_0/Z_b]};$$

$$k = \frac{2\pi f}{c} = \frac{\omega}{c}.$$

Here f is the acoustic frequency (in Hz), ω is the angular frequency 2πf. L/2 is the distance from each port to the microphone diaphragm. k is the acoustic wavenumber $$\frac{2\pi}{\lambda}$$

(λ is the acoustic wavelength), and $Z_0$ is equal to the product of the air density p and the speed c of sound in air, divided by the cross sectional area S of the front (or rear) duct:

$$Z_0 = \frac{\rho c}{S}.$$

It is evident from the preceding equation for K(ω) that in principle, a proper design of the branch conduits (and thus of the branch impedances $Z_b$) can substantially remove resonant behavior from the frequency response K(ω) of the overall acoustical system.

The branch impedance $Z_b$ of the branch conduits is a sum of a resistive component $R_b$ and a reactive component $iX_b$: $Z_b = R_b + iX_b$, wherein i is the unit imaginary number.

As noted, each of the branch conduits ends at an acoustically rigid termination. The reactive component of the branch impedance therefore is the reactive impedance of a rigidly capped pipe, given theoretically by the following well-known formula:

$$X_{b1} = i \left( \frac{\rho_0 c}{S_b} \right) \cot \left( \frac{kL}{2} \right).$$

(The numeral "1" in the subscript of $X_{b1}$ denotes that this is the first illustrative embodiment of the invention.)

The resistive component $R_{b1}$ of the branch impedance may be expressed in terms of the imaginary part (referred to as the damping constant)α of a complex acoustic wavenumber k'; i.e., k'=2π/λ+iα.

Thus, for each branch conduit, the reactive impedance is given theoretically by:

$$R_{b1} = \left( \frac{\rho_0 c}{S_b} \right) \frac{\alpha L}{\sin^2 \left( \frac{2\pi L}{\lambda} \right) + (\alpha L)^2 \cos^2 \left( \frac{2\pi L}{\lambda} \right)},$$

where $S_b$ is the branch cross sectional area.

The amount of dissipation of acoustic energy in the branch conduits depends upon the branch-conduit cross sectional area. This area is readily varied along the length of the conduit. Manufacturing processes are available that can reproduceably provide such variation. For example, techniques of injection molding are readily applied to provide such variation in conduits formed within a base of polymeric material.

Such variations of cross-sectional area are readily tailored to provide a desired resistive impedance $R_{b1}$ and, concomitantly, a desired amount of dissipation.

For example, a serrated pattern, such as patterns 23 and 23' of FIG. 2A, is readily provided by periodically varying $S_b$ between a higher value $S_1$ and a lower value $S_0$ at a spatial period $l_S$. A sawtooth pattern of serrations is preferable, since the sharp vertices of such a pattern are associated with high viscous losses that are helpful for dissipating acoustic energy. According to an approximate theory based on an idealized, comb-shaped serration pattern (but nonetheless helpful for the insights it may give into the operation of the invention), the serration pattern has a damping constant α given theoretically by $$\alpha = 5.86 \times 10^{-5} \sqrt{\frac{f}{S}} + \frac{1}{16 c l_s} \sqrt{\frac{2\pi f \mu S_0 d_0}{\rho_0 S_1 l_s}},$$

where μ is the coefficient of viscosity for air and $d_0$ is the perimeter of the area $S_0$. (See, e.g., Morse and Ingard, *Theoretical Acoustics*, Princeton University Press (1986), p.491, and Kinsler et al., cited above, p.210.)

By way of illustration, we have plotted in FIG. 3 the theoretically predicted magnitude of the transfer function K(ω) as a function of frequency for the unmodified SOD microphone of FIG. 1, using the following values for the parameters L and S:

L=0.0635 m

S=2×10$^{-6}$ m.

The resonant response associated with the front and rear conduits is evident in FIG. 3 at a frequency of approximately 2700 Hz.

For comparison, we have plotted in FIG. 4 the theoretically predicted frequency response of the transfer function K(ω) of the inventive SOD microphone of FIG. 2A with serrations 23, 23' included within the branch conduits. (The parameters of the main conduits are as stated above.) The following parameters are associated with the serrations:

$l_s = 10^{-5}$ m
$d_0 = 1.34 \times 10^{-3}$ m
$S_1 = 2 \times 10^{-6}$ m$^2$
$S_0 = 0.9 S_1$.

It is evident from FIG. 4 that the signal output at the microphone electrical terminals 10 is substantially free from acoustic resonances.

As noted above and as illustrated in FIG. 2B, an alternative feature for dissipating acoustic energy is a short and narrow neck 25,25' for acoustically connecting each branch conduit 24, 24' to its corresponding front or rear conduits. The length $l_{SS}$, width w, and height t of each neck are all desirably not more than one-tenth the wavelength of the resonance to be dissipated. The length of the neck is preferably included in the total length of the corresponding branch conduit.

The cross-sectional area of the neck should be smaller than the cross-sectional area of the main portion of the corresponding branch conduit, in order to provide an acoustic impedance at the resulting constriction, to dissipate acoustic energy. It is advantageous for ease of fabrication, but not essential, for the branch conduits 24, 24' to have a cross sectional area $S_b$ equal to the cross sectional area S of the front and rear conduits 8, 8', 9, 9'.

When necks 25, 25' are used for energy dissipation, the theoretical branch conduit impedance $Z_{b1}$ is given by:

$$Z_{b1} = \frac{12\mu l_{ss}}{t^3 w} + i \left[ \frac{\rho_0 c}{S_b} \cot(kL/2) - \frac{6\rho_0 \omega l_{ss}}{5wt} \right].$$

Figure 5:
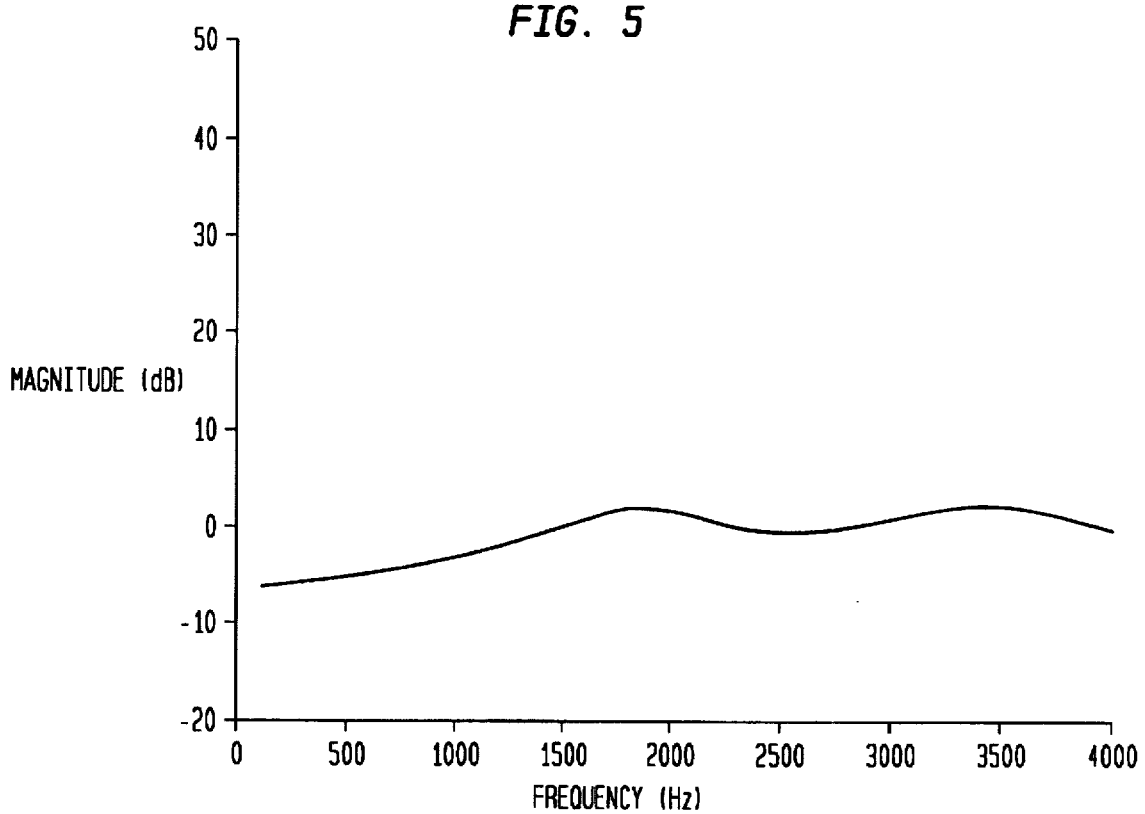
FIG. 5 is a theoretical plot of the frequency response of the acoustical transfer function, $K(\omega)$, from each port to the microphone diaphragm for the inventive SOD microphone of FIG. 2B.

Plotted in FIG. 5 is the theoretically predicted frequency response of the transfer function K(ω) for the branch conduits and necks of FIG. 2B with the following parameter values:

$t = 10^{-4}$ m
$w = 2 \times 10^{-3}$ m
$l_{ss} = 1.9 \times 10^{-3}$ m.

It is evident from FIG. 5 that the signal output from electrical leads 10 is substantially free of resonant behavior over the frequency band 100–4000 Hz.

In a second illustrative embodiment of the invention, to be described with reference to FIG. 2C, the lengths and diameters (or other lateral dimensions) of the branch conduits 26, 26' are made no more than about one-tenth the wavelength associated with the acoustic resonance to be dissipated. The far end of each branch conduit (i.e., the end distal the front or rear conduits) connects into a respective front or rear cavity 27, 27' having a prescribed volume and constituting the resonant cavity of, respectively, a front or rear Helmholtz resonator.

As is well known, a Helmholtz resonator is an acoustical system comprising a rigid enclosure of a given volume, communicating with the external medium through a small opening. To a good approximation, the acoustical behavior of such a system can be described in terms of a simple mechanical oscillator having a resonant Helmholtz resonators are described, e.g., in Kinsler et al., cited above.

This embodiment of the invention makes use of the fact that a Helmholtz resonator connected to the sidewall of a duct that is transporting acoustic energy will cause attenuation of the acoustic energy over a band of frequencies centered around the resonant frequency of the resonator. In at least some cases, the volumes of the front and rear Helmholtz resonators, and the cross sectional areas and lengths of the connecting conduits, can be chosen such that the resulting microphone will have no substantial resonant response for, e.g., frequencies below 4000 Hz. Thus, a frequency response will be provided that substantially resembles the responses of typical prior-art SOD microphones that perform electronic differencing of the responses from two appropriately spaced FOD microphones.

It should be noted in this regard that the shapes of cavities 27, 27' and of the small, connecting branch conduits 26, 26' are not critical. However, the acoustic impedance presented by the front Helmholtz resonator (i.e., the front resonant cavity in combination with the front branch conduit) to the front conduits should be the same, or nearly the same, as the acoustic impedance presented by the rear Helmholtz resonator to the rear conduits.

Let branch conduits 26, 26' each have length $l_h$, diameter d, and cross-sectional area $S_b$. (For purposes of the following theoretical analysis, the branch conduits are circular in cross section.) Let cavities 27, 27' each have volume V. These respective cavities are conveniently made in the same shape, although this is not essential. The branch impedance $Z_{b2}$ of each Helmholtz resonator is theoretically given by the following expression (the numeral "2" in the subscript denotes that this is the second illustrative embodiment of the invention):

$$Z_{b2} = 7.58 \times 10^{-4} \left( \frac{l_h}{d^4} \right) + i \left[ \frac{\rho_0 c^2}{\omega V} - \frac{\rho_0 \omega (l_h + 0.85d)}{S_b} \right].$$

Figure 6:
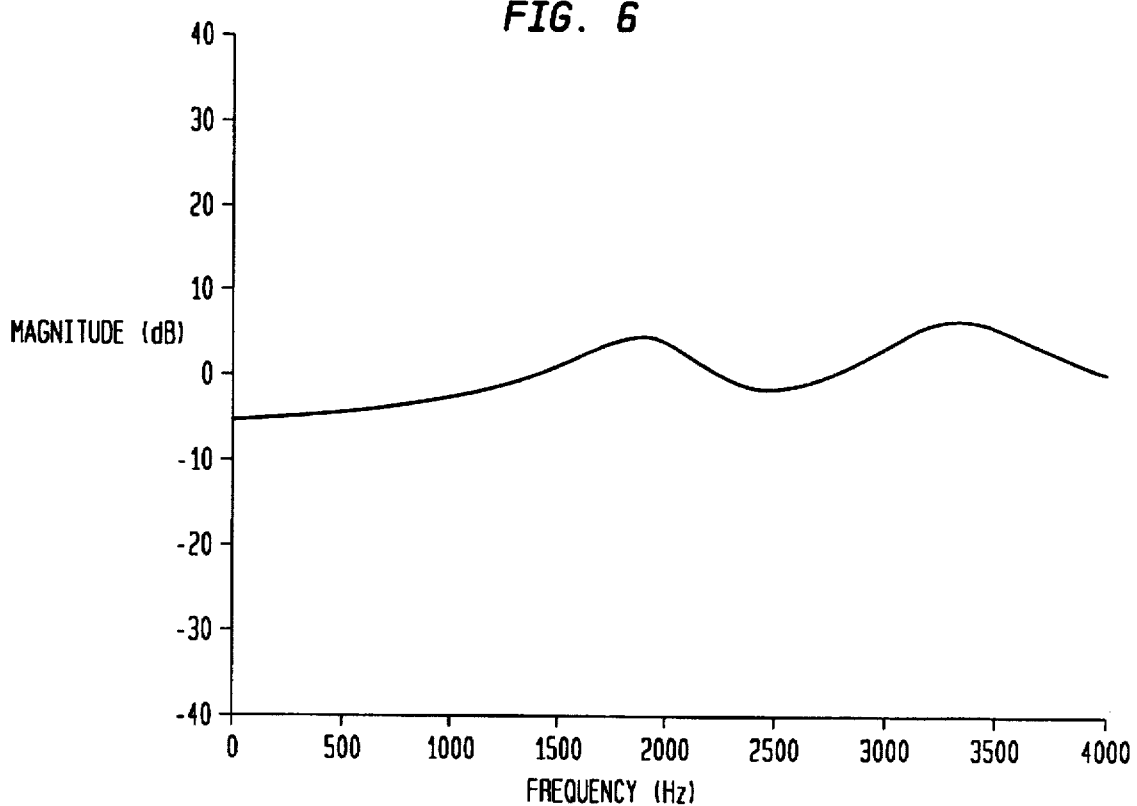
FIG. 6 is a theoretical plot of the frequency response of the acoustical transfer function, $K(\omega)$, from each port to the microphone diaphragm for the inventive SOD microphone of FIG. 2C.

In FIG. 6, we have plotted the theoretically predicted frequency response $K(\omega)$ for this case, with the following parameter values:

$l_h = 10^{-3}$ m
$d = 2.57 \times 10^{-4}$ m
$V = 2 \times 10^{-8}$ m$^3$.

It is evident in FIG. 6 that the signal output from the microphone leads 10 is substantially free from acoustic resonances.

The invention claimed is:

1. Apparatus comprising a Second Order Differential (SOD) microphone of the kind in which a First Order Differential microphone element communicates with respective front and rear chambers, said front chamber communicates with respective first and fourth ports via two respective front conduits, and said rear chamber communicates with respective second and third ports via two respective rear conduits, CHARACTERIZED IN THAT a) said SOD microphone further comprises first and second side chambers for dissipating acoustic energy of undesired resonances of the microphone;

b) the first side chamber communicates with the front conduits; and c) the second side chamber communicates with the rear conduits.

2. Apparatus of claim 1, wherein each of the side chambers comprises a branch conduit approximately equal in length to one-quarter wavelength of an undesired resonance, and each side chamber is acoustically equivalent to the other.

3. Apparatus of claim 2, wherein the undesired resonance is a resonance of the front and rear conduits.

4. Apparatus of claim 2, wherein each branch conduit has a length dimension and a cross-sectional area that varies periodically along the length dimension.

5. Apparatus of claim 2, wherein: each of the branch conduits comprises a main segment and further comprises a neck joining the main segment to the corresponding front or rear conduits; each neck is smaller in cross-sectional area than its corresponding main segment; each neck is shorter in length than one-tenth said wavelength of an undesired resonance; and each neck is smaller, in all dimensions transverse to its length, than one-tenth said wavelength of an undesired resonance.

6. Apparatus of claim 1, wherein each of the side chambers comprises one of a pair of acoustically equivalent Helmholtz resonators, each said Helmholtz resonator comprising a branch conduit and a resonant cavity.

7. Apparatus of claim 6, wherein each resonant cavity has a volume chosen to provide dissipation of an undesired resonance, and each branch conduit is smaller in all dimensions than one-tenth wavelength of the undesired resonance.

* * * * *